April 23, 1935.   C. W. DAKE   1,998,709
BRAKE DRUM
Filed July 25, 1932   2 Sheets-Sheet 1

Inventor
Charles W. Dake
By Liverance
and
Van Antwerp
Attorneys

April 23, 1935. C. W. DAKE 1,998,709
BRAKE DRUM
Filed July 25, 1932 2 Sheets-Sheet 2

Inventor
Charles W. Dake
By Liverance and
Van Antwerp
Attorneys

Patented Apr. 23, 1935

1,998,709

UNITED STATES PATENT OFFICE 1,998,709

BRAKE DRUM

Charles W. Dake, Grand Haven, Mich., assignor to Campbell, Wyant & Cannon Foundry Company, Muskegon Heights, Mich., a corporation of Michigan Application July 25, 1932, Serial No. 624,607

1 Claim. (Cl. 22—203)

This invention relates to a composite metal brake drum for vehicles and the like, particularly for motor vehicles, and to a method of producing the composite drum by casting centrifugally an outer supporting shell onto and around an inner metal band, whereby a composite brake drum is produced wherein a lining or braking band of high braking characteristics and qualities, supported by an outer shell having a high degree of resistance to rupture or breaking is produced. Brake drums ordinarily have been made heretofore from pressed or rolled metals, such as steel or the like, and have recently in considerable measure been replaced by brake drums with an inner wearing band of cast iron having a continuous fused bonded connection to an outer supporting shell of wrought metal, such as steel or the like, and the process has been to centrifugally cast the band at the inner side of and against the outer shell.

With my invention the process is reversed and an inner band, which may be of cast iron or other suitable material, having high braking characteristics, has molten metal to provide an outer supporting band cast around it. The outer supporting shell when cooling, shrinks and contracts onto the inner band and with the use of aluminum as the material for the outer shell, a brake drum having high qualities of heat dissipation for conducting and dissipating the heat generated, when the brake drum is subjected to the friction of the brake within it, is produced.

Figure 1:
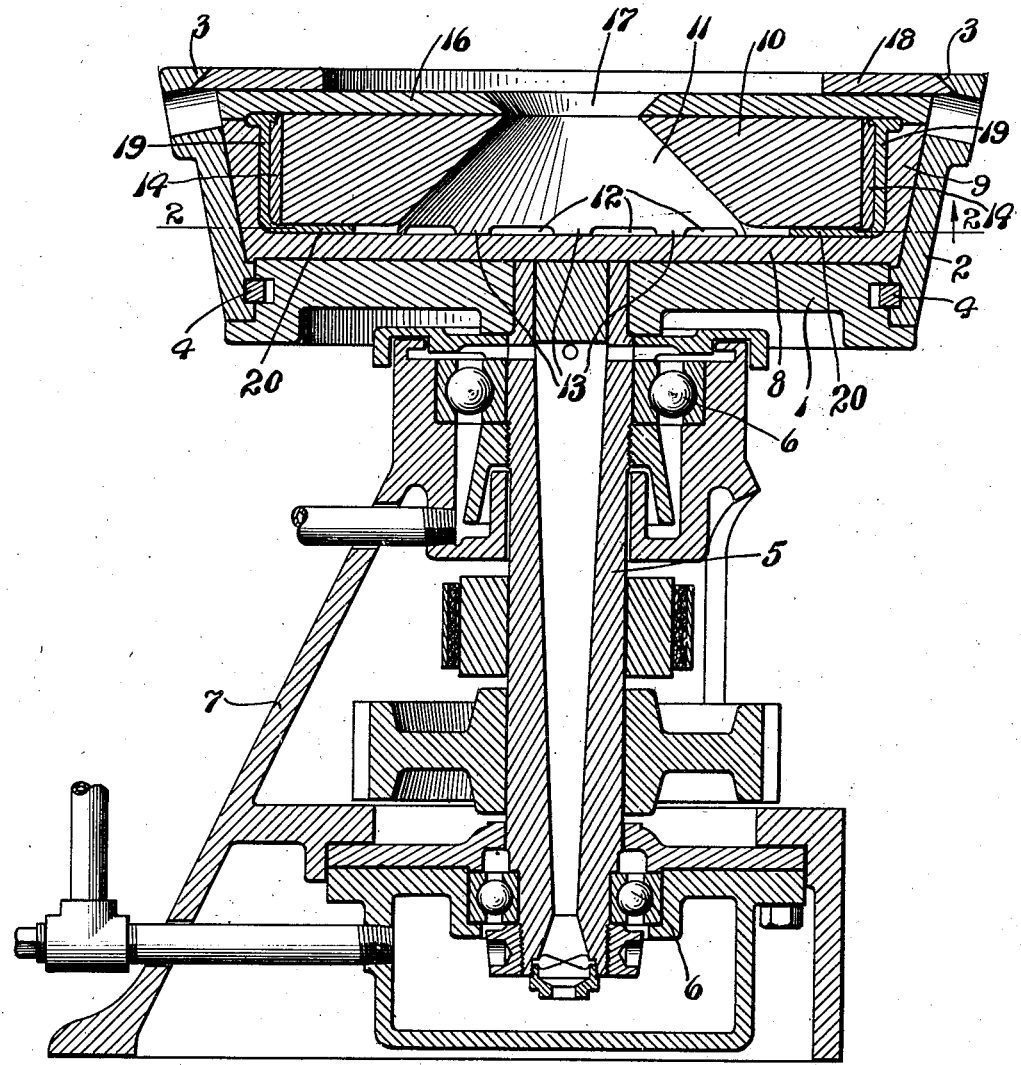
Figure 2:
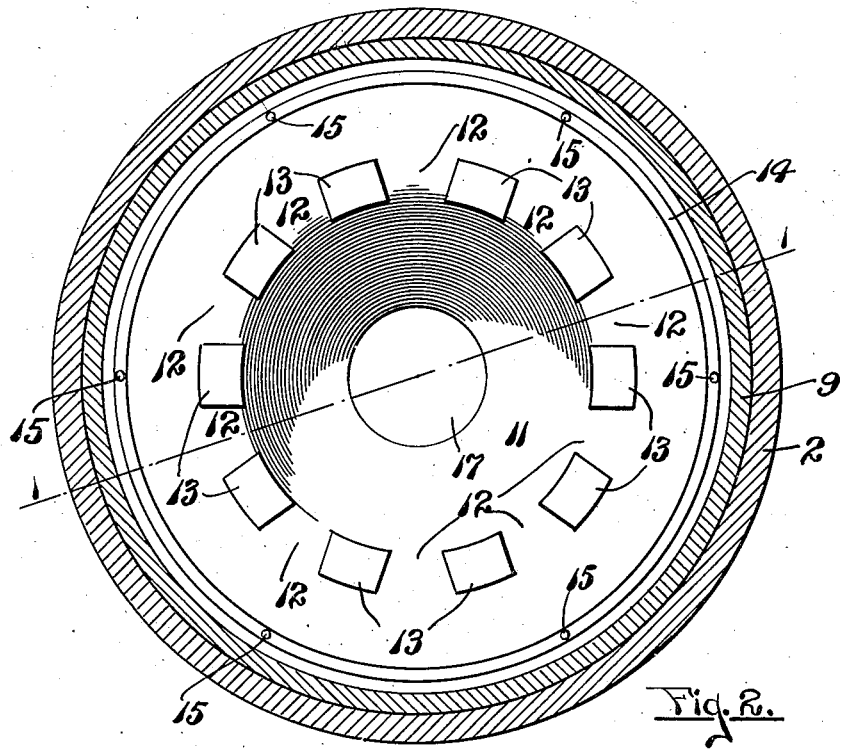

An understanding of the invention for the attainment of the objects stated, as well as others not at this time specifically enumerated, may be had from the following description, taken in connection with the accompanying drawings, in which, Fig. 1 is a central vertical section through an apparatus by means of which the method or process of my invention may be carried out, the plane of the section being substantially on line 1—1 of Fig. 2.

Figure 3:
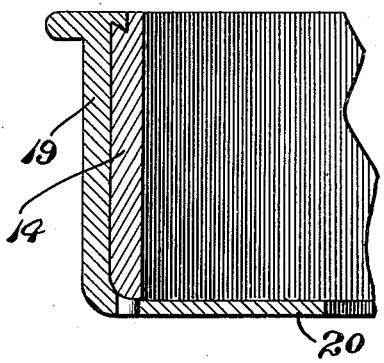

Fig. 2 is a horizontal section on the plane of line 2—2 of Fig. 1 looking in an upward direction, and Fig. 3 is a fragmentary enlarged vertical section through one side of the completed composite brake drum.

Like reference characters refer to like parts in the different figures of the drawings.

The apparatus shown in Fig. 1 includes a mold holder having a base 1 and an upwardly and outwardly extending mold surrounding ring 2, at the upper edges of which and at the inner side there is provided a continuous annular undercut lip 3. This ring 2 is peripherally connected to the base 1 by a snap ring connection 4 as shown in Fig. 1.

The base 1 of the mold holding member is fixed to the upper end of a vertical spindle 5 mounted in anti-friction bearings 6 in a suitable support 7. The spindle may be driven at a desired rate of speed in any suitable manner and the stopping of the spindle rotation is controlled by a suitable brake indicated but not numbered in Fig. 1. The mold includes a cup-like outer member having a bottom 8 and annular sides 9 shaped peripherally to fit snugly within the mold holder which has been described. Within the mold is a core 10 of cylindrical form having a central conical opening 11 of progressively increasing diameter from its upper to its lower side, from which gate passages 12 extend underneath the core between spacing feet 13 integral with the core and which rest upon the upper side of the bottom 8 of the mold.

The inner wearing band 14 for the brake drum is located in the mold around the core 10. It, preferably, is of cast iron or a similar metal and may be located in the mold and supported at its lower edges above the upper side of the bottom 8 by supporting pins 15 so as to permit the flow of molten metal through the gates 12 into the space between the annular sides 9 of the outer member of the mold and outer side of the cast metal band 14.

The mold is completed at its upper side by a plate 16 having a central pouring opening 17 which joins with the upper end of the conical recess 11 previously described; and the parts are releasably held and locked in place against movement when the apparatus is rotated by a segmental ring 18 comprising a plurality of segments, the outer edges of which are cut at an incline to fit against the undersides of the overhanging annular lip 3 previously described.

With the mold assembled as described and as shown in Fig. 1, and with the mold and its holder rotating at a preferred speed, which may be such that the peripheral speed of the outer portions of the mold reaches or exceeds 4000 lineal feet per minute, the molten metal, which is to form the outer supporting member of the brake drum, and which may be melted aluminum, is poured through the opening 17 into the mold coming to the upper side of the bottom 8 and flowing, by reason of centrifugal force, through the gate passages 12 into the mold cavity and thence rising so as to completely fill all portions of the mold cavity and engaging and interlocking with the inner wearing band 14. Said band 14 may be provided with an annular groove of the shape shown at its upper edge and, if preferred, may be provided with other groove formations so as to provide a secure interlock of the supporting shell with the inner band when the melted aluminum from which the supporting shell is made has cooled and solidified. As the aluminum is under relatively heavy pressure and also rolling action during cooling, its resulting density will naturally be greater than that of aluminum cast in the usual manner. The pressure in the vertical part of the molds will be relatively great with respect to usual practice and will vary in intensity from the inner to the outer sides. Thus the density will correspondingly vary. This is the natural and unalterable result of centrifugal force. The drum shell includes an annular band 19 with an inturned backing flange 20 which is designed to be attached to a wheel either directly or through the intermediary of a sheet metal back which may be secured to the flange 20 after the drum has been produced.

Aluminum, having a high coefficient of expansion, contracts very snugly upon a band such as the band 14 of the cast iron metal. It is obvious that the cast metal band may be heated prior to being placed in the mold and this would necessarily be desirable and in fact essential should the material for the outer supporting shell be of a metal having less ability to conduct and dissipate heat than has aluminum. In such case it is necessary that there be a substantially integral fused bond between the cast metal band and the outer supporting shell of steel or the like. Steel melted and heated above its melting point of 2550° F. will fuse with the outer surface portions of a cast iron band, such as the band 14 providing such outer or surface portions of the cast metal band are raised to a sufficiently high temperature, by heat from the melted steel and an initial heating of the band to a temperature which preferably will be 1200° F. or more, there being a balanced temperature produced between the steel and cast iron at their contacting surfaces which will effect and produce a fused bonding connection between them. With the band 14 initially heated and with the steel at the necessary temperature which molten steel must have to flow freely, that is, considerable above the melting point of steel, or above approximately 2650° F. there can be assurance of the continuous fused bonded connection so essential for the uniform and proper distribution of heat which occurs when generated by the friction of brakes against the braking surface of the drum.

The invention accordingly is not to be limited to any particular materials and with different materials used of course different temperature relations of the band and of the melted metal cast around the same will be used.

The invention is defined in the appended claim and is to be considered comprehensive of any process coming within the scope of the process claim appended.

I claim:

The process of making a composite brake drum which consists, in preforming a cast metal continuous cylindrical braking band, locating said band in a mold including a core within said band whereby the molten metal cannot come against the inner side of the band, said core also being spaced from the bottom of the mold, and locating a surrounding mold around the band spaced therefrom to provide a continuous mold cavity around the band, said core having a central opening, revolving said mold at substantially 4000 lineal feet per minute, and pouring molten metal through the central opening of said core, whereby the molten metal is thrown outwardly by centrifugal action to fill the cavity of the mold around said band and the space underneath the core.

CHARLES W. DAKE.